(12) United States Patent
Brinkhuis et al.

(10) Patent No.: US 7,799,858 B2
(45) Date of Patent: Sep. 21, 2010

(54) COMMIXTURES FOR USE IN RHEOLOGY MODIFICATION

(75) Inventors: Richard Hendrikus Gerrit Brinkhuis, Zwolle (NL); Martin Bosma, Arnhem (NL)

(73) Assignee: Nuplex Resins B.V., Bergen Op Zoom (NL)

( * ) Notice: Subject to any disclaimer, the term of this patent is extended or adjusted under 35 U.S.C. 154(b) by 0 days.

(21) Appl. No.: 11/795,096

(22) PCT Filed: Jan. 10, 2006

(86) PCT No.: PCT/EP2006/000138

§ 371 (c)(1),
(2), (4) Date: Oct. 30, 2007

(87) PCT Pub. No.: WO2006/074895

PCT Pub. Date: Jul. 20, 2006

(65) Prior Publication Data
US 2008/0146720 A1  Jun. 19, 2008

(30) Foreign Application Priority Data

Jan. 11, 2005  (EP) .................................. 05075061
Jun. 28, 2005  (EP) .................................. 05105754

(51) Int. Cl.
*C08L 75/02* (2006.01)
*C08L 39/00* (2006.01)
*C08K 3/34* (2006.01)

(52) U.S. Cl. ....................... 524/445; 524/612; 524/589; 524/555; 525/540; 525/452

(58) Field of Classification Search ................. 524/445, 524/612, 589, 555, 540, 452, 507
See application file for complete search history.

(56) References Cited

U.S. PATENT DOCUMENTS

| 3,367,920 | A | * | 2/1968 | Wasserman et al. | 525/418 |
| 4,165,329 | A | * | 8/1979 | Dreher et al. | 554/106 |
| 4,528,319 | A |  | 7/1985 | Ottaviani et al. | 524/540 |
| 6,589,604 | B2 | * | 7/2003 | Luettenberg | 427/407.1 |
| 2002/0166630 | A1 | * | 11/2002 | Bonilla | 156/331.4 |
| 2005/0119422 | A1 | * | 6/2005 | Baumgart et al. | 525/540 |
| 2006/0223954 | A1 | * | 10/2006 | Brinkhuis et al. | 525/452 |
| 2006/0289828 | A1 | * | 12/2006 | Brinkhuis et al. | 252/183.11 |
| 2008/0139755 | A1 | * | 6/2008 | Brinkhuis | 525/452 |

FOREIGN PATENT DOCUMENTS

| WO | WO 03/037849 A |   | 5/2003 |
| WO | WO 03/091350 A |   | 11/2003 |
| WO | WO 2005005557 A1 | * | 1/2005 |
| WO | WO 2005005558 A1 | * | 1/2005 |

OTHER PUBLICATIONS

"International Search Report and the Written Opinion of the International Searching Authority", mailed April 11, 2006, for PCT International Application No. PCT/EP2006/000138.

* cited by examiner

*Primary Examiner*—Marc S. Zimmer
*Assistant Examiner*—Noah Frank
(74) *Attorney, Agent, or Firm*—Coraline J. Haitjema; David P. Owen; Howrey LLP

(57) ABSTRACT

The use of a commixture as a sag control agent (SCA) in a composition to be cured at a temperature ($T_{cur}$) greater than 60° C., said composition comprising a binder and the commixture and wherein said commixture comprises: (a) a thixotropy-inducing particulate polyurea product having a melting temperature ($T_{m1}$) at least 10° C. below the intended curing temperature, thereby satisfying the requirement $T_{m1} < (T_{cur} - 10° C.)$; and (b) a second thixotropy-inducing particulate component that retains its particulate nature at temperatures at least up to said curing temperature.

23 Claims, 7 Drawing Sheets

COMMIXTURES FOR USE IN RHEOLOGY MODIFICATION

This application is a 35 U.S.C. §371 national phase application of International Application Number PCT/EP2006/000138, filed Jan. 10, 2006, and claims priority to European Patent Application No. 05075061.1, filed Jan. 11, 2005, and European Patent Application No. 05105754.5, filed Jun. 28, 2005, the entire contents of which are incorporated by reference herein.

FIELD OF THE INVENTION

The invention relates to the use of a commixture of thixotropy-inducing agents as a sag control agent in a curable composition and, more particularly, a curable coating compositions.

BACKGROUND OF THE INVENTION

The use of polymer coatings to protect surfaces and enhance the aesthetic and functional properties of materials is well known. These polymer coatings are typically applied to surfaces as liquid systems using techniques such as rolling, brushing, sprinkling, casting and pneumatic or electrostatic spraying.

There is a need to control the rheological profile of these liquid systems such that the coating can be applied to a substrate by the method of choice without problems and then flow evenly over the substrate, allowing surface unevenness introduced by the application step, as well as unevenness from the underlying substrate, to be leveled out as much as possible. Concomitantly the applied liquid film should not be allowed to sag or form tears on non-horizontal substrates. Such sagging can be particularly pronounced when thicker film coatings are applied and where the substrate has features such as at edges, holes and character lines which can promote localized build-up of the film.

As a consequence of these requirements the use of rheology modification agents in coating compositions to create a pseudoplastic, thixotropic rheology profile, to limit or prevent sagging defects is widespread; it is particularly important in the automotive coating market—and more particularly for clear coatings used in that industry—where obtaining extremely well-leveled films without sagging complications is of the highest importance.

Following the step of applying a coating composition to a substrate many coatings are subjected to curing and/or drying processes; it is equally important to control the rheological profile of the coating at these later stages. For instance when a fluid top coat layer applied to a substrate is shrinking due in part to the release of volatile compounds, the profile of the underlying substrate can be transferred to the coat layer. This process is known as "telegraphing" and is independent of the roughness originally introduced in the spraying step. For applications which use a heating step following the application and an optional flash-off period at low temperature, the spraying roughness may have been allowed to level to a great extent, but solvent evaporation may introduce new roughness in these late stages of drying/curing, thereby disturbing an originally well-leveled surface. The more shrinkage of the top coat, the more pronounced this transfer of the substrate roughness may be. This telegraphed roughness which develops during the drying and/or curing process can still be leveled out, provided that the coating film still has enough mobility ("fluidity") left after (partial) development of the telegraphed roughness and before it finally crosslinks.

Other physical phenomena related, for example, to layer thickness variations on non-perfect substrates and to the impact of developed surface tension gradients can also contribute to late stage introduction of new surface roughness and also require late stage fluidity to be leveled out again.

There is a need for a rheology control agent for coating applications with a curing cycle effected at temperatures of more than 60° C., that allows for a good balance between effective sagging reduction of a coating formulation, that extends far enough in the heating cycle, and on the other hand provides not only for sufficient leveling of the spraying roughness originally introduced, but also for leveling of substrate roughness developing only in the latest stages of the drying/curing cycle.

Presently available rheology control agents tend to suffer from deviations from this ideal balance to one side or another by failing to compensate for the conflicting rheological requirements throughout the application, curing and drying stages.

Rheology control agents—such as organoclays and fumed silica—have been employed to limit the sagging of clear coat formulations in which a high temperature cure process is used. Such rheology control agents are described in C. H. Hare, "Thixotropes and additives for modifying paint flow", J. Prot. Coat Linings, No. 79 (April 2001). The rheology control agents limit sagging by building up a high structure viscosity after application. If this structure viscosity is lost too rapidly in the curing cycle, sagging may still occur in the later stages of the curing because of the low viscosity of the hot coating film. Therefore, these rheology control agents act to maintain a high viscosity during the curing cycle. However, such high-temperature active rheology control agents limit the potential of the coating to allow for the leveling of telegraphed roughness developing only in the late stages of drying/curing, with a negative effect on appearance.

SUMMARY OF THE INVENTION

These deficiencies in the prior art are overcome by the present invention which discloses the use of a commixture as a sag control agent (SCA) in a composition to be cured at a temperature ($T_{cur}$) greater than 60° C., said composition comprising a binder and the commixture and wherein said commixture comprises: (a) a thixotropy-inducing particulate polyurea product having a melting temperature ($T_{m1}$) at least 10° C. below the intended curing temperature, thereby satisfying the requirement $T_{m1} < (T_{cur} - 10°$ C.); and (b) a second thixotropy-inducing particulate component that retains its particulate nature at temperatures at least up to said curing temperature. The term 'sag control' is herein not intended to encompass the phenomenon of pigment settling as a main objective. The melting temperature of the thixotropy-inducing particulate (a) is chosen such that its particulate nature is effectively lost at a temperature below the curing temperature.

The commixtures when acting as a sag control agents (SCA) exhibit thixotropic behaviour, combining low viscosities at the high and medium shear stresses (>5 Pa) associated with application, with high viscosities at lower shear stresses corresponding to those created by gravity in wet coating layers on non-horizontal surfaces (<1 Pa). This thixotropic character is further characterized by fast time-dependent viscosity recovery after application to ensure that as the coating becomes leveled, it does not sag whilst still wet on the surface. Importantly, the commixture provides for good leveling control of late stage telegraphed roughness during drying/curing of the coating compositions comprising it.

The applicants have found that there is functional reciprocity between the high and low melting temperature components of the commixture. The thixotropic behaviour of the commixture exhibits some flow at the late stages of curing, even after shrinkage has occurred due to solvent loss for example; this is considered favorable for the leveling out of surface unevenness telegraphed from the underlying substrate. Furthermore, these characteristics have been shown not to change significantly with storage time of the liquid coating composition.

In accordance with a preferred embodiment of the invention the commixture is use in a composition to be cured at a temperature greater than 90° C. and more preferably 120° C. Most preferably the commixture is used in a composition to be cured at a temperature between 130° C. and 150° C.

The term "melting" is here intended to include both the thermally induced change of state from solid to liquid and the thermally induced dissolution or decomposition of a solid in a solvent containing system. Furthermore it is envisaged that some of the components (b) of the commixture may not exhibit melting at any temperatures used for curing of the compositions. For practical purposes, the melting temperatures of these components can be regarded as infinite.

The melting points ($T_m$) of the components of the commixture (thixotropic agents) were obtained from differential scanning calorimetry (DSC) of samples comprising the thixotropic agents in their particulate form in a resin/solvent blend. DSC experiments were conducted using a TA Instruments DSC 2920 and aluminum, hermetic sealed crucibles containing 10±5 mg material. The sample was first cooled to a low temperature (between −40° C. and 0° C.) and isothermally conditioned for 3 minutes. Under a helium atmosphere (25 ml/min), the sample temperature was then increased at a rate of 10° C./min to a high temperature (125° C. or higher) well above the melting temperature of the commixture. The endothermic peak visible in the recorded heat flow in the heating run was integrated, and the temperature at which 80% of the endothermic heat had been consumed, was used as the $T_m$ value.

Importantly, the polyurea reaction product (a) is rheologically active in the flash-off stage. Furthermore, the second component (b) is selected such that it is does not lose its particulate nature before gelation of the coating occurs; in remaining particulate during the curing of the commixture, the second component (b) is able to maintain a structural viscosity contribution throughout the curing cycle.

The two-component rheology modification agent provides a flexibility that cannot be achieved using known, single component systems. The composition of the commixture—in particular the relative amounts and individual rheological efficiency of the individual components—can be adapted to compensate (and optimise the coating) for: the thickness of the coating to be applied; the orientation of the substrate with respect to the horizontal; the surface tension; the thermal regime associated with any concomitant curing of the coating composition after application; the amount and volatility of solvents applied; the viscosity response to loss of solvents and changes in temperature; surface tension gradients developing upon solvent evaporation and the curing rate.

Preferably the ratio of the polyurea reaction product to the second component (by weight) in the commixture is greater than 5:95, more preferably greater than 10:90 and most preferably greater than 20:80. Furthermore, preferably the ratio of the polyurea reaction product to the second component (by weight) in the commixture is lower than 95:5, more preferably lower than 90:10 and most preferably lower than 80:20.

It is clear that variation in the weight ratio of each of the components in the commixture is an important optimisation tool.

In particular, the high temperature flow can be controlled by tuning the respective melting points of components (a) and (b) and the ratio in which they are used—allowing for the generation of smoother and more glossy coating surfaces.

In accordance with a preferred embodiment of the invention, the melting point ($T_{m1}$) of the polyurea product (a) is more than 10° C. below the intended curing temperature of the composition. It is further preferred that the melting point of the polyurea product is greater than 60° C. but more than 10° C. below the curing temperature of the composition in which the commixture is used (i.e. 60° C.<Tm<Tcure−10° C.). It is also preferred that the melting temperature ($T_{m1}$) of said first polyurea component (a) is higher than ($T_{cure}$−60° C.), more preferably higher than ($T_{cure}$−50° C.) and even more preferably higher than ($T_{cure}$−40° C.).

In accordance with a preferred embodiment of the invention the polyurea reaction product (a) is derived by reaction of an amine with a polyisocyanate. Preferably said polyisocyanate is an aliphatic one and preferably said amines comprise predominantly mono-amines. In an specific embodiment said amines are chiral, mono-amines provided in a non-racemic mixture i.e. in an enantiomeric excess. The term 'chiral amine' is intended to mean an amine covalently bonded to a carbon atom, said carbon atom having three different substituents such that it is chiral. A wide range of chiral amines may also be employed in principle. Preferably the chiral amines are amines having one hydrogen atom on the carbon atoms next to the amine group and two different other substituent groups.

Although a plurality of thixotropy-inducing particulate compounds could be envisaged by the skilled man for the high-temperature stable component (b) of the commixture, it is preferred that this second component is selected from the group consisting of silica, polymeric microgels, clays and polyurea based products. Preferably, said second component (b) of the commixture is a polyurea reaction product and more preferably said second component polyurea reaction product is derived by reaction of a polyisocyanate with an amine and said polyisocyanate is selected from the group consisting of HMDI, trans-1,4-cyclohexylene diisocyanate, m-xylylene diisocyanate, p-xylylene diisocyanate, tetramethylxylylene diisocyanate and toluene diisocyanate.

The invention further relates to a method of curing a composition comprising a binder and, as a sag control agent (SCA), a commixture of (a) a thixotropy-inducing particulate polyurea product having a melting temperature Tm1 and (b) a second thixotropy-inducing particulate component having a melting temperature $T_{m2}$ where $T_{m2}$>$T_{m1}$+10° C., said method comprising heating said composition to a curing temperature $T_{cur}$ greater than 60° C. but wherein $T_{m1}$<($T_{cur}$−10° C.)<$T_{m2}$.

As is typical in the field of coating technology, it is preferred that this curing process occurs on a substrate to which the composition has been applied. Furthermore, it is preferred that said curing temperature $T_{cur}$ is in the range from 120° C. to 150° C., most preferably approximately 140° C. The two described method embodiments apply also in regard to compositions further comprising cross-linking agents (in particular including non-isocyanate types) and solvents.

In accordance with a further aspect of the invention there is provided a commixture for use as a sag control agent (SCA) comprising (a) a thixotropy-inducing particulate polyurea product having a melting temperature $T_{m1}$ and (b) a second thixotropy-inducing particulate component having a melting temperature $T_{m2}$ wherein $T_{m2}>(T_{m1}+10°$ C.). Preferably the melting properties of the commixture are defined by the equations $T_{m1}<130°$ C. and $T_{m2}>140°$ C. In such an embodiment, it is preferred that $T_{m1}>50°$ C., preferably $>70°$ C., more preferably $>80°$ C. and most preferably $>90°$ C.

The invention further relates to the use of the commixture as a sag control agent in a coating composition said coating composition comprising the commixture dispersed in a binder together with, for example, solvents and/or cross-linking agents as further components.

This invention more particularly relates to the use of the commixture as a sag control agent in a coating composition itself used in the preparation of a clear coating for automotive OEM, automotive refinish and automotive plastic application.

DETAILED DESCRIPTION OF THE INVENTION

The polyurea product (a) of low melting point ($T_{m1}$) is typically prepared by the reaction of a polyisocyanate with dominantly mono-amines, or, with inverted functionalities, by the reaction of effectively mono-isocyanates (including diisocyanates that have been selectively reacted at one side) with polyamines. The use of the prefix "poly" for polyisocyanates indicates that at least two of the mentioned functionalities are present in the respective "poly" compound. It is noted that when a polyurea product is prepared by the reaction product of amines with a polyisocyanate, it is preferred to prepare a diurea product or a triurea product.

The polyisocyanates are preferably selected from the group consisting of aliphatic, cycloaliphatic, aralkylene, and arylene polyisocyanates, more preferably from the group consisting of substituted or unsubstituted linear aliphatic polyisocyanates (and their isocyanurates, biurets, uretdiones) and substituted or unsubstituted aralkylene and cyclohexylene polyisocyanates. The polyisocyanate usually contains 2 to 40 and preferably 4 to 12 carbon atoms between the NCO groups. The polyisocyanate preferably contains at most four isocyanate groups, more preferably at most three isocyanate groups, and most preferably two isocyanate groups. It is even more preferred to use a symmetrical aliphatic or cyclohexylene diisocyanate. Suitable examples of diisocyanates are preferably selected from the group consisting of tetramethylene-1,4-diisocyanate, hexamethylene-1,6-diisocyanate (HMDI), trans-cyclohexyl-1,4-diisocyanate, dicyclohexyl-methane-4,4'-diisocyanate, 1,5-dimethyl-(2,4-ω-diisocyanato methyl)benzene, 1,5-dimethyl(2,4-ω-diisocyanatoethyl)benzene, 1,3,5-trimethyl(2,4-ω-diisocyanato-methyl)benzene, 1,3,5-triethyl(2,4-ω-diisocyanatomethyl)benzene, meta-xylylene diisocyanate, para-xylylene diisocyanate, dicyclohexyl-dimethylmethane-4,4'-diisocyanate, 2,4-toluene diisocyanate, 2,6-toluene diisocyanate, and diphenylmethane-4,4'-diisocyanate (MDI). Further suitable polyisocyanates are preferably selected from the group consisting of polyisocyanates based on HMDI, including condensed derivatives of HMDI, such as uretdiones, biurets, isocyanurates (trimers), and asymmetrical trimers, etc., many of which are marketed as Desmodur® N and Tolonate® HDB and Tolonate® HDT. Particularly preferred polyisocyanates are selected from the group consisting of HMDI, its isocyanurate trimer, its biuret, trans-cyclohexylene-1,4-diisocyanate, para- and meta-xylylene diisocyanate, and toluene diisocyanate. Most preferably, HMDI or its isocyanurate are selected.

As will be understood by the person skilled in the art, it is also possible to use conventionally blocked polyisocyanates which generate two or more isocyanates in situ, as long as the blocking agent, after splitting, does not prevent the formation of the rheology modification agent according to the invention Throughout this document the term "polyisocyanate" is used to denominate all polyisocyanates and polyisocyanate-generating compounds.

As will also be understood by a person skilled in the art, the same urea products can be made in a reverse way, given that amines can be converted to isocyanates, and isocyanates to amines. Products of such "reverse" synthesis procedures, although they may be unfavoured in terms of availability of the raw materials, are also considered part of the scope of the invention.

In accordance with a preferred embodiment of the invention the amines used to prepare the first component (a) of the rheology modification agent comprise mono-amines. Many mono-amines can be used in combination with the polyisocyanates to create polyurea reaction products with the low melting point ($T_{m1}$) property specified. Aliphatic as well as aromatic amines can be used, and primary as well as secondary amines. Preferably, aliphatic primary amines are used; of these n-alkylamines and ether-substituted n-alkylamines are particularly useful in generating low melting temperature polyurea compounds in accordance with this invention.

In a specific preferred embodiment, it is preferable that these amines are chiral. More preferably the mono-amines comprise greater than 20%, more preferably greater than 50%, and most preferably greater than 80%, chiral amines.

It is to be understood that any enantiomer mixture of chiral amines can be used to make the first component (a) of the rheology modification agent of this invention. Good results can be obtained if the chiral amine is a racemic mixture of enantiomers. It is however preferred that in deriving the first, lower melting point ($T_{m1}$) urea-based component, the chiral amine is provided in a significant enantiomeric excess. The term "enantiomeric excess" is used to indicate the excess of one enantiomer over racemic material in a sample that comprises both enantiomers of the chiral amine. The enantiomeric excess is preferably at least 25%, more preferably at least 50%, and most preferably at least 75%.

A preferred chiral amine to be used to derive the first component (a) polyurea product is given by the general formula (I) below:

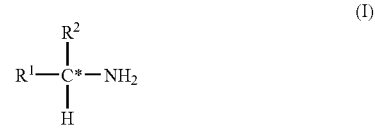

(I)

wherein each of $R^1$ and $R^2$ are independently selected from the group consisting of linear, cyclic or branched, substituted or unsubstituted, saturated or unsaturated hydrocarbyl or a heteroatom containing group, and wherein $R^1$ and $R^2$ of each chiral amine are different such that the carbon atom in the amine is a chiral center. More preferably the substituents $R^1$ and $R^2$ are independently selected from the group consisting of (optionally hetero-atom containing) $C_1$-$C_{25}$ alkyl, aryl, aralkyl, alkenyl and ester groups. Most preferably, $R^2$ is a methyl group.

It is possible that the substituents $R^1$ and $R^2$ can be taken together with the chiral carbon $C^*$ to which they are attached and form a substituted or unsubstituted ring containing 4 to 8 carbon atoms, provided that said ring is such that chirality is maintained at the carbon atom $C^*$.

In the generation of the polyurea products (a) [or (b) as will be described hereinafter], the ratio of the number of amino groups of the amine compounds to the number of (generated) isocyanate groups may be in the range of 0.7 to 1.5. Preferably, the ratio is about 0.9 to 1.1.

The reaction between each isocyanate and each amine components can be carried out in any arbitrarily chosen way by combining the reaction components, optionally at elevated temperature, as will be clear to a person skilled in the art. It is preferred that the reaction is carried out at temperatures in the range of 0° C. to 150° C., more particularly in the range of 20° C. to 80° C. Although in general the reaction components are combined in any arbitrarily chosen manner, preferably each isocyanate is added to each amine component, which may be done in several steps, if desired. Optionally, the reaction may be carried out in the presence of an inert solvent, for example acetone, methyl isobutyl ketone, N-methyl pyrrolidone, benzene, toluene, xylene, or an aliphatic hydrocarbon such as petroleum ether, alcohols, and water, or mixtures thereof, or in the presence of a binder for the final composition or any other coating formulation component. Here the term "inert" indicates that the solvent does not significantly interfere in the process of polyurea formation, which means that the amount of polyurea formed when solvent is present is at least 80% of the amount produced when no solvent is present. It is also possible that small amounts of coreactive components are intentionally employed in this reaction to act as crystallisation modifiers, and more particularly to modify the crystal sizes upon precipitation or the colloidal stability of the resulting crystals. Equally, dispersant and other adjuvants may be present in any of these introduction steps.

The preparation of each of the polyurea products may be carried out in the presence of a binder and certainly it is preferred that the polyurea reaction product compound is prepared as a colloid in the host resin environment. This can be done by mixing a mixture of the binder and the isocyanate with the amine components or by mixing the isocyanates with a mixture of the binder and the amine components, or by mixing two mixtures of binder with amine components and NCO-components, respectively. It will be obvious that if the binder is highly reactive with either the amines or the isocyanate, the binder and that particular susceptible compound cannot be premixed. By the term "highly reactive" is meant here that more than 30% of the susceptible amine or isocyanate reacts with the binder before the amino acid derivative and the isocyanate are mixed in order to prepare the rheology modification agent. The mixing operation may be carried out in any convenient manner, with the reactants being vigorously stirred, in a batch or in a continuous process. Amine components may be added to isocyanate or isocyanate may be added to amine components, whichever is most convenient. If a binder is used and either the amine components or the isocyanate is highly reactive with the binder, then the compound that is most reactive with the binder is preferably added to the mixture of the binder with the compound that is least reactive with the binder.

Alternatively the polyurea product can be formed in a separate reaction and introduced from a solution in a suitable solvent into a binder, under proper stirring, to form a particulate colloid.

The second component (b) of the commixture is characterized by the fact that it maintains its particulate nature, as well as its rheological activity, effectively until the gelation stage of the coating. Suitable rheology control agents may be silica, clay, polymeric microgels, and polyurea based agents. Preferably, they are polyurea agents, that can be made along the same lines as discussed above for the low $T_m$ SCA's, only this time with high melting points.

Preferred polyisocyanates to prepare high $T_m$ polyureas from are HMDI, trans-1,4-cyclohexylene diisocyanate, m-xylylene diisocyanate, p-xylylene diisocyanate, tetramethylxylylene diisocyanate and toluene diisocyanate; preferred monoamines include n-aliphatic amines, cyclohexylamine, benzylamine and 2-phenethylamine. A specifically preferred high $T_m$ polyurea is the adduct of HMDI and benzylamine. The use of diamines (e.g. ethylenediamine) as component next to mono-amines may also be an option to create high melting point polyureas.

For the reverse synthetic strategy, the use of m- or p-xylylenediamine in combinations with mono-isocyanates is preferred. Specifically preferred are adducts of m- or p-xylylenediamine with cyclohexylisocyanate.

In accordance with this invention the commixture is prepared by blending the low melting temperature polyurea product (a) with the second component (b) in a composition environment. The important aspect of this blending step is to ensure that the two components are adequately commixed and the skilled person would be aware of a plurality of continuous and discontinuous processes for achieving this. For example, as has been stated in the preceding paragraphs the low melting point polyurea product (a) may be prepared in the presence of the binder; the second component (b) of the commixture may then be blended into that host resin environment.

Where the higher melting point or non-melting second component (b) is itself a polyurea product it is possible for both the first ($T_{m1}$) and second ($T_{m2}$) polyurea products to be produced and precipitated in the presence of each other and in the presence of the binder (which may optionally comprise other components such as solvents, cross-linking agents and the like to the extent that these do not interfere with polyurea formation). The polyurea products are each preferably generated as colloids in the host resin environment. The operation of mixing the reactants used to generate the polyurea products may be carried out in any manner that ensures intermixing of the respective products throughout the batch and avoids localised aggregations of each reaction product.

Alternatively a particulate polyurea component can be formed in an environment already containing the complementary component. Although it is less desired, binder or curing compositions comprising the commixture as a rheology modification agent may also be prepared or modified in the presence of said rheology modification agent or by preparing the binder or curing compound as well as the rheology modification agent at the same time. The skilled person will have no problem combining the rheology modification agent, or the starting materials for a rheology modification agent, with the starting materials for the binder or curing compound, with subsequent reaction to form the rheology modification agent-containing binder or curing compositions.

The binder that can be thixotropized according to the invention may as a rule be any arbitrarily chosen binder. However suitable examples include polyesters, polyurethanes, alkyd resins, acrylic resins, epoxy resins, unsaturated polyester resins which may optionally be mixed with styrene and/or one or more other monomeric compounds, for instance, a (meth)acrylate monomer or an allyl compound. Functional groups on the binders may comprise hydroxyl groups, acid groups, carbamate groups, epoxy groups, (meth) acryloyl groups, reactive ether groups, (blocked) isocyanate groups, keto groups, acetoacetoxy groups, amine groups, hydrazide groups, allyl groups and other unsaturated groups. The aforementioned binders may be solvent or water-borne as solutions or as dispersions in these solvents, or alternatively may be supplied without any solvent.

The most important use of the commixture is as a sag control agent in a coating composition which are used to generate coatings having a better combination of sagging resistance and optical appearance. These coating compositions comprise a binder and, as a sag control agent, the defined commixture or a sag control agent. A coating composition may be prepared by mixing the commixture, the binder and optional other coating composition components in particular solvents and cross-linking agents. Preferably the coating composition comprises the binder, a solvent and 0.1 to 10 wt %, preferably 0.2 to 7 wt % and most preferably between 0.3 to 5 wt % (relative to the total solid weight of the composition) of the commixture, which is dispersed in the binder. The coating composition may contain other adjuvants such as dispersants.

The commixtures as rheology modification agents can be used in all kinds of thermoplastic and crosslinking coatings formulations; they are preferably used in coating compositions based on polyol-isocyanate curing (including all blocked isocyanates, and compounds as Cylink 2000 (®Cytec) in which OH functions can be exchanged at carbamate groups), polyol-curing with formaldehyde based crosslinkers (e.g. the melamine formaldehyde types commonly used), polycarbamates with formaldehyde based crosslinkers, sterically hindered amines (e.g. Desmophen® NH 1220, Desmophen® NH 1420, and Desmophen® NH 1521) with isocyanates, thiols with isocyanates, (meth)acryloyl based coating compositions, epoxy curable coating compositions (using acids, anhydrides or amines as crosslinker), silane curing coatings and any systems combining more than one of these chemistries, the latter also referred to as hybrid curable coating compositions (e.g. acryloyl based systems integrated in an OH—NCO curing system). Other crosslinking chemistries that may be used in combination with the rheology control agents of the invention, are based on keto-functional binders, or acetoacetoxy functional binders, or binders than can cure through an oxidative mechanism (e.g. using unsaturated polyesters), or by a radical mechanism triggered by a thermal radical initiator, a photoinitiating system, or high energy radiation.

Optionally, conventional additives may be present in any of the coating compositions of the present invention, such as other cobinders, crosslinking agents, solvent and/or dispersing additives, pigment dispersants, dyes, pigments, nanoparticles, UV curing additives, flow additives, other rheology control additives, solvents, and accelerators for the curing reaction, for instance acidic compounds such as p-toluene sulphonic acid or blocked products thereof.

The coating compositions may comprise other conventional rheology modification agents which may be solvent based or solventless. In another embodiment, the other conventional rheology modification agents are water based liquids. Irrespectively, it is preferred that the coating formulations are clear and can therefore be utilised to prepare clear, non-pigmented films.

The thixotropic coating compositions may be applied to a substrate in any desired manner, for instance by rolling, pneumatic or electrostatic spraying, brushing, sprinkling, casting, and dipping. The compositions of the invention are particularly suited for spraying applications.

The degree to which the rheology of the coating compositions is changed, depends, inter alia, on the proportion and the nature of the blended components and the further components of the composition. As a rule, the desired degree of thixotropy may be obtained by employing the commixture as a rheology modification agent preferably in an amount of at least 0.01%, more preferably at least 0.05%, even more preferably at least 0.10%, and most preferably at least 0.15%, and preferably of at most 30%, more preferably at most 10%, even more preferably at most 3%, and most preferably at most 1.5%, based on the total weight of the coating composition.

The applied coating compositions are preferably curable by baking in the range between 60° C. and 250° C., and more preferably in the range 90° to 165° C. and most preferably in the range 120° C. to 150° C. for between 2 and 120 minutes.

The invention also relates to a coating prepared from a coating composition according to the invention. A specific preferred application for the commixture as a rheology modification agent is within clear coats for automotive refinishing or automotive plastic application.

EXAMPLES

Examples of the products of the invention and comparative examples will now be described by way of illustration only, and not to limit the invention. The Examples shall be described with reference to the accompanying figures in which.

Figure 1:
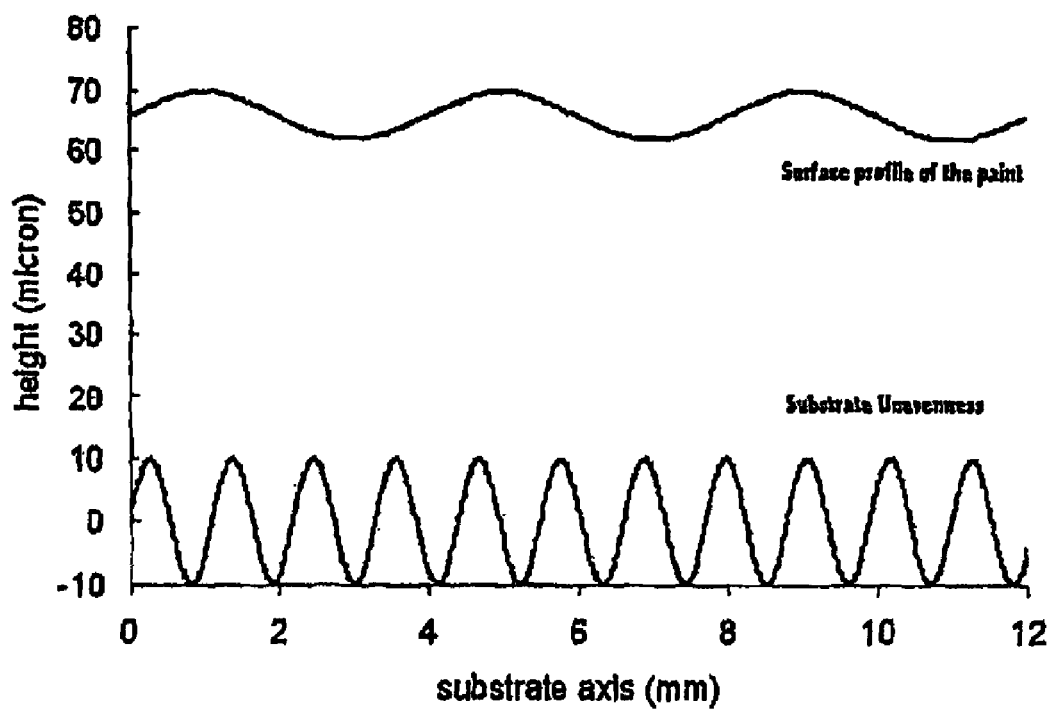
FIG. 1 is a representation of a patterned substrate and the surface profile of a paint after its direct application to the substrate.

The compounds referred to in the Examples and Comparative Examples are recognised, industrially available compounds commonly used in the manufacture of polyurea compounds:

Setalux™, Setal™ and Setamine™ formulations are all available from Nuplex Resins Solvesso™ formulations are aromatic hydrocarbons available from ExxonMobil Chemicals;

Tolonate™ is an isocyanate crosslinker available from Rhodia PPMC.

Furthermore, herein the following common abbreviations will be utilised:

HDI: Hexamethylene diisocyanate

AMBA: Alpha (α-)methylbenzylamine

BA: Benzylamine

L-alabu: L-alanine butylester

The prefixes R-, S- (employed herein for amines) and L- (employed herein for amino acids) are used in accordance with their normal meaning in the nomenclature of stereogenic centres.

Preparation of Individual Sag Control Agents

The skilled man would be aware that each component of the commixture could itself be labeled as a "sag control agent" (SCA). In the examples and comparative examples, such individual sag control agents are compared to blends of SCAs—as SCA commixtures—prepared in accordance with the invention. A description of the single component SCA modified resins used is given below.

SCA A is a commercial urea SCA based on HDI and benzylamine in host resin Setalux® 1756, available as Setalux® 91756 from Nuplex Resins.

SCA B 152.1 grams of Setal® 166 SS80 was added in a reactor, and mixed with 2.54 g L-alanine butyl ester, using a rotating disk dissolver at 1500 rpm for 2 minutes. The stirring speed was raised to 4000 rpm, and 1.43 g of 1,6-hexamethylenediisocyanate was added using a syringe. The mixture was stirred for an additional 30 seconds at 4000 rpm.

SCA C is a commercial urea SCA based on HDI and benzylamine In host resin Setalux® 1795, available as Setalux® 91795 from Nuplex Resins.

SCA D 100.0 g of Setalux® 1795 VX-74 was added in a reactor, and mixed with 1.71 g of a mixture of 2.98 g of S-(-)-α-methylbenzylamine and 0.32 g R-(+)-α-methylbenzylamine, using a rotating disk dissolver at 1500 rpm for 2 minutes. The stirring speed was raised to 4000 rpm, and 1.21 g of 1,6-hexamethylenediisocyanate was added using a syringe. The mixture was stirred for an additional 30 seconds at 4000 rpm.

SCA E.

99.99 g of Setalux® 1795 VX-74 was added in a reactor, and mixed with 1.84 g L-alanine butyl ester, using a rotating disk dissolver at 1500 rpm for 2 minutes. The stirring speed was raised to 4000 rpm, and 1.09 g of 1,6-hexamethylenediisocyanate was added using a syringe. The mixture was stirred for an additional 30 seconds at 4000 rpm.

SCA F 100.06 g of Setalux® 1795 VX-74 was added in a reactor, and mixed with 1.48 g 3-methoxypropylamine, using a rotating disk dissolver at 1500 rpm for 2 minutes. The stirring speed was raised to 4000 rpm, and 1.44 g of 1,6-hexamethylenediisocyanate was added using a syringe. The mixture was stirred for an additional 30 seconds at 4000 rpm.

Melting Behaviour of SCA's

The values for the melting points of the SCA's used, were obtained from differential scanning calorimetry (DSC) experiments on the SCA masterbatch, in the resin/solvent blend in which they were prepared.

DSC experiments were conducted using a TA Instruments DSC 2920 and aluminum, hermetic sealed crucibles containing 10±5 mg material. The sample was first cooled to low temperatures (between −40° C. and 0° C.), isothermally conditioned for 3 minutes. Following this, the temperature was increased at a rate of 10° C./min to a temperature above the melting temperature of the SCA (typically 125° C. or higher). The temperature program was run under helium atmosphere (25 ml/min).

The endothermic peak visible in the recorded heat flow in the heating run was integrated, and the temperature at which 80% of the endothermic heat had been consumed, was used as the Tm value.

The melting points of these single component SCA preparations obtained using DSC, are listed in Table 1.

TABLE 1

| SCA | $T_m$ (° C.) |
| --- | --- |
| A | 187 |
| B | 97 |
| C | 176 |
| D | 98 |
| E | 101 |
| F | 126 |

Falling Wave Measurements

For the falling wave tests, a clear coat formulation, with solids content chosen to match the initial viscosity of the freshly-sprayed paint on the substrate, was applied onto a glass substrate using a special application bar driven by an automatic film applicator. The application bar has a sinusoidal shaped surface with a wavelength of 4 mm and amplitude of ca. 4 µm. In all experiments the wet paint layer thickness was adjusted such that a final dry film thickness of ca 40 µm was obtained.

Directly after application of the paint, the coated glass panel was transferred to the temperature-controlled support plate of the falling wave apparatus and the experiment was started. The paint surface was illuminated with a line shaped light source set at an angle of 45° relative to the application direction of the waves. The reflection of this line-shaped light from the paint surface was recorded using a camera and stored on a PC using image analysis software. From the measured reflection both the position and shape of the waves were calculated in a quantitative manner using a dedicated software program.

The angle of inclination of the temperature-controlled support plate with coated substrate was set at 0° (=horizontal) to determine the horizontal leveling behavior, or at 60° to determine the leveling and sagging behavior under more vertical panel orientation. The wet paint was allowed to dry under ambient conditions (21-22° C., 50-55% rh) for 300 or 600 seconds after which the temperature of the support plate was increased to 140° C. to mimic high-temperature baking of the paint, at an initial rate of 0.5-1° C./sec.

The determined change of the shape (e.g. decrease of amplitude) of the waves is a measure of the degree of leveling. On non-horizontal panels, the amount of sagging is determined from the movement of the waves towards the bottom of the panel (wave-shift). The amount of sagging observed is expressed in millimeters displacement of the surface profile applied.

In some experiments, the effect of telegraphing was studied by applying the wet paint on a patterned steel substrate having sinusoidal grooves with a wavelength of 1.1 mm and an amplitude of 10 µm. FIG. 1 is a schematic presentation of the substrate unevenness and the surface profile of the paint directly after application. Curve-fitting of the measured surface roughness of the drying/curing paint subsequently enables separation of the telegraphed profile from the applied surface profile. For these experiments, a horizontal orientation of the panel was used.

Example 1

A 1K crosslinking clear coat formulation was prepared to obtain an overall polyol binder composition based on Setal® 166 and Setalux® 1795 in a 1:1 weight ratio based on resin solids, with SCA being introduced through the use of SCA formulation A (HDI-BA in Setalux® 1795) as well as SCA formulation B (HDI-L-alabu in Setalux® 1795). Setamine® US-138 was added as crosslinker, in a ratio 70/30 polyol/crosslinker on solids. Baysilone OL-17 (0.06% on solids) was added as wetting additive. The SCA concentration was chosen to be 0.5 wt % HDI-BA, and 0.7 wt % HDI-L-alabu on solids. The formulation was diluted with Solvesso® 100 to 60.6% on solids.

Comparative Example 1

A 1K crosslinking clear coat formulation was prepared to obtain an overall polyol binder composition based on Setal® 166 and Setalux® 1795 in a 1:1 weight ratio based on resin solids, with SCA being introduced through the use of SCA formulation A (HDI-BA in Setalux® 1795). Setamine® US-138 was added as crosslinker, in a ratio 70/30 polyol/crosslinker on solids. Baysilone OL-17 (0.06% on solids) was added as wetting additive. The SCA concentration was chosen to be 1.4 wt % on solids. The formulation was diluted with Solvesso® 100 to 60.6% on solids.

Figure 2:
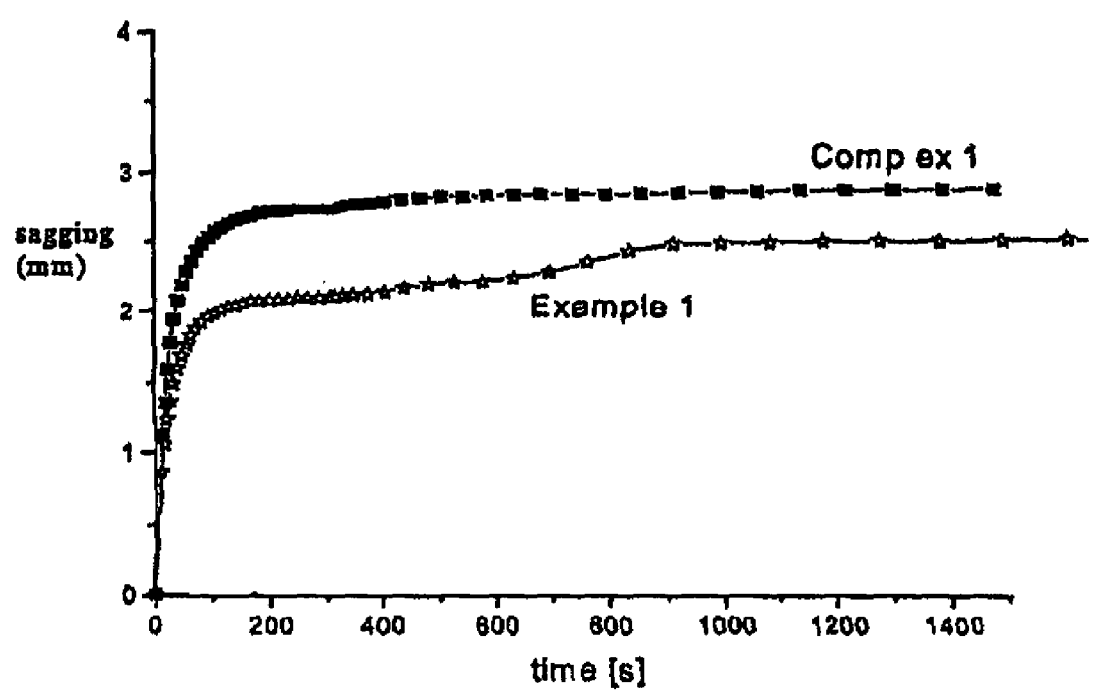
FIG. 2 illustrates the degree of sagging of formulations of Example 1 and Comparative Example 1 (as detailed below) and as determined in falling wave experiments.

The formulations of comparative example 1 and example 1 were chosen such that both formulations had the same degree of sagging as determined from falling wave experiments, and as illustrated in FIG. 2.

Figure 3:
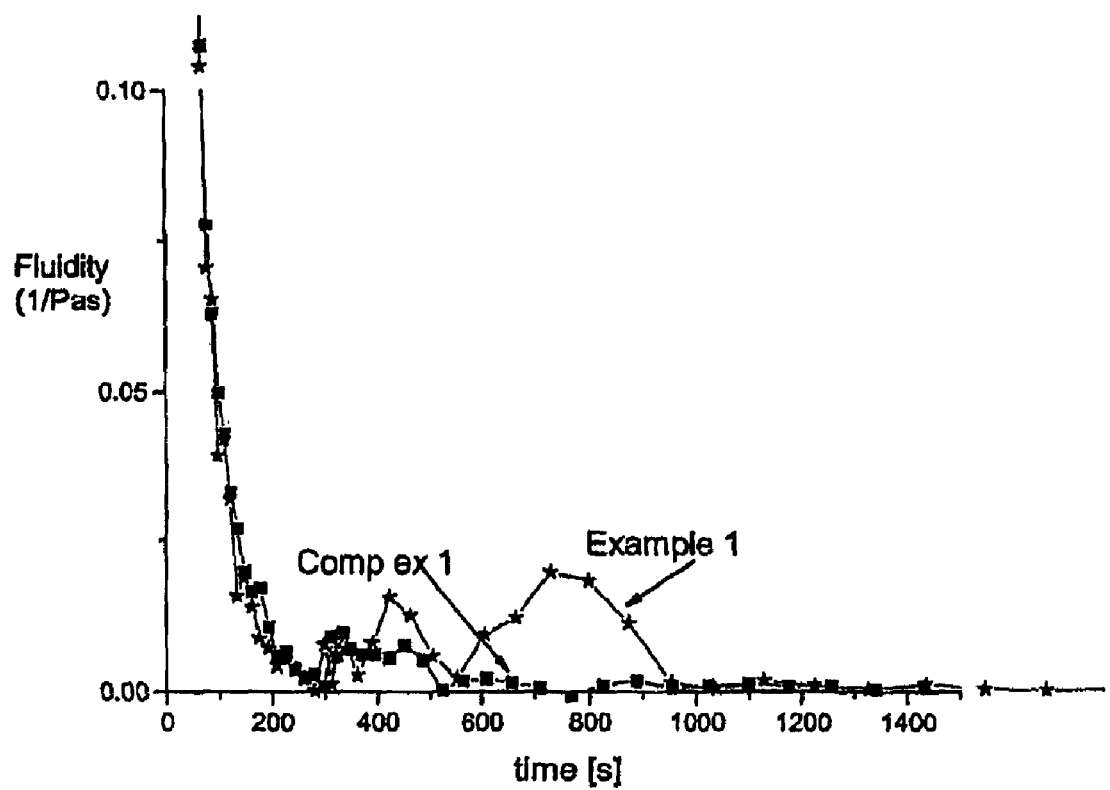
FIG. 3 illustrates the paint (coating) fluidity of formulations of Example 1 and Comparative Example 1 (as detailed below) and as determined in falling wave experiments.

Comparative example 1 shows the major part of the total amount of sagging during the flash-off period (300 sec); the amount of sagging is very low during the curing stage. Example 1 exhibits about more than 80% of the total amount of sagging during the initial flash-off drying, the rest in the curing stage. The corresponding paint fluidity for these two formulations is shown in FIG. 3.

These two SCA-modified formulations were also applied on a patterned telegraph substrate to study the effect of telegraphing on the final appearance of these paints. A summary of the results of these tests is shown in FIG. 4.

The amplitude of the telegraphed surface roughness is zero directly after application of the paint. During the drying period the telegraphed surface roughness increases. For formulation of comparative example 1, the amplitude of the telegraphed roughness reaches a maximum after about 650". From that time onwards—and as shown in FIG. 3—this amplitude remains more or less constant as leveling-out of the surface roughness is to a large extent hindered by the very low fluidity of the paint.

For the formulation of example 1, the fluidity of the paint in the oven is high enough to allow almost complete leveling-out of the telegraphed roughness between 500" and 700" after application of the paint. After about 800", shrinkage occurring after the gel-point of the curing paint causes a slight increase of the amplitude of the telegraphed roughness again.

Figure 4:
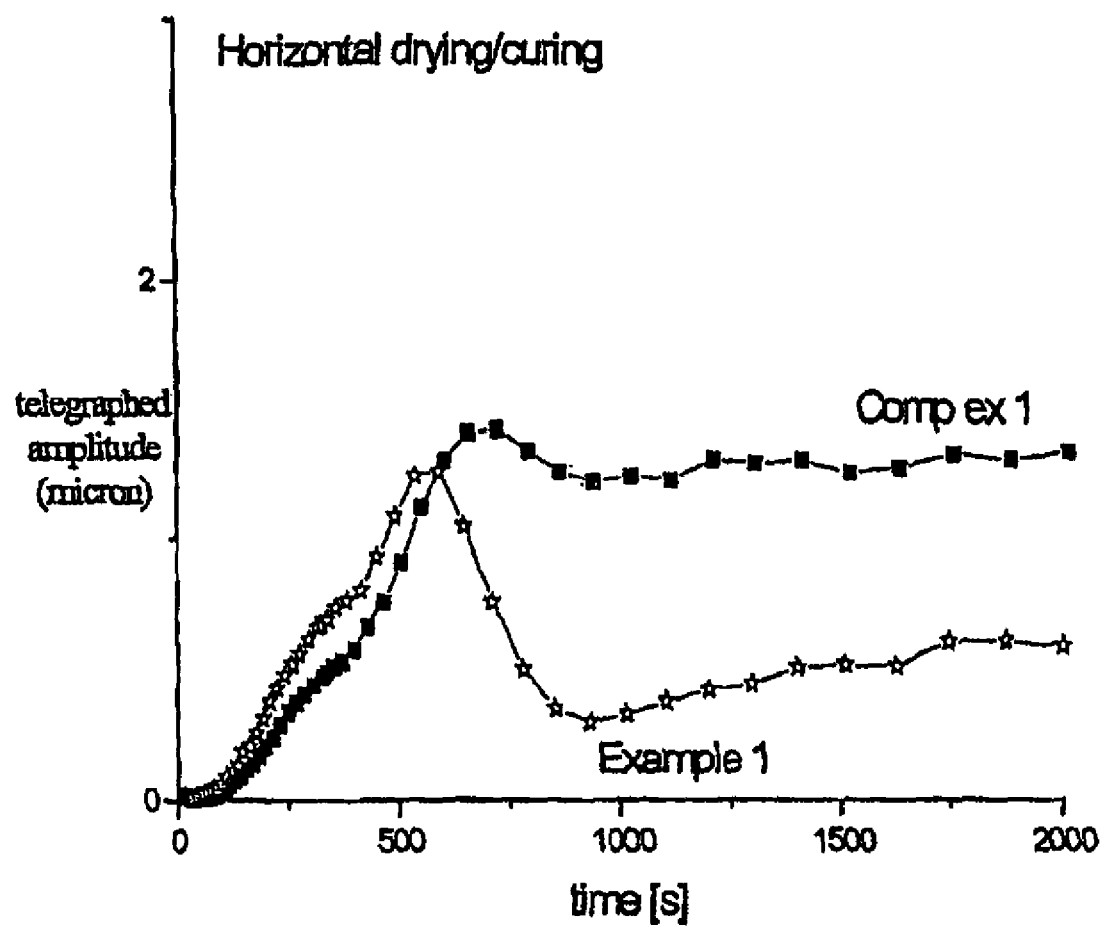
FIG. 4 illustrates the amplitude of telegraphed roughness of substrate-applied paints (coatings) prepared in accordance with the present invention (Example 1) and in accordance with the prior art (Comparative Example 1).
Figure 5:
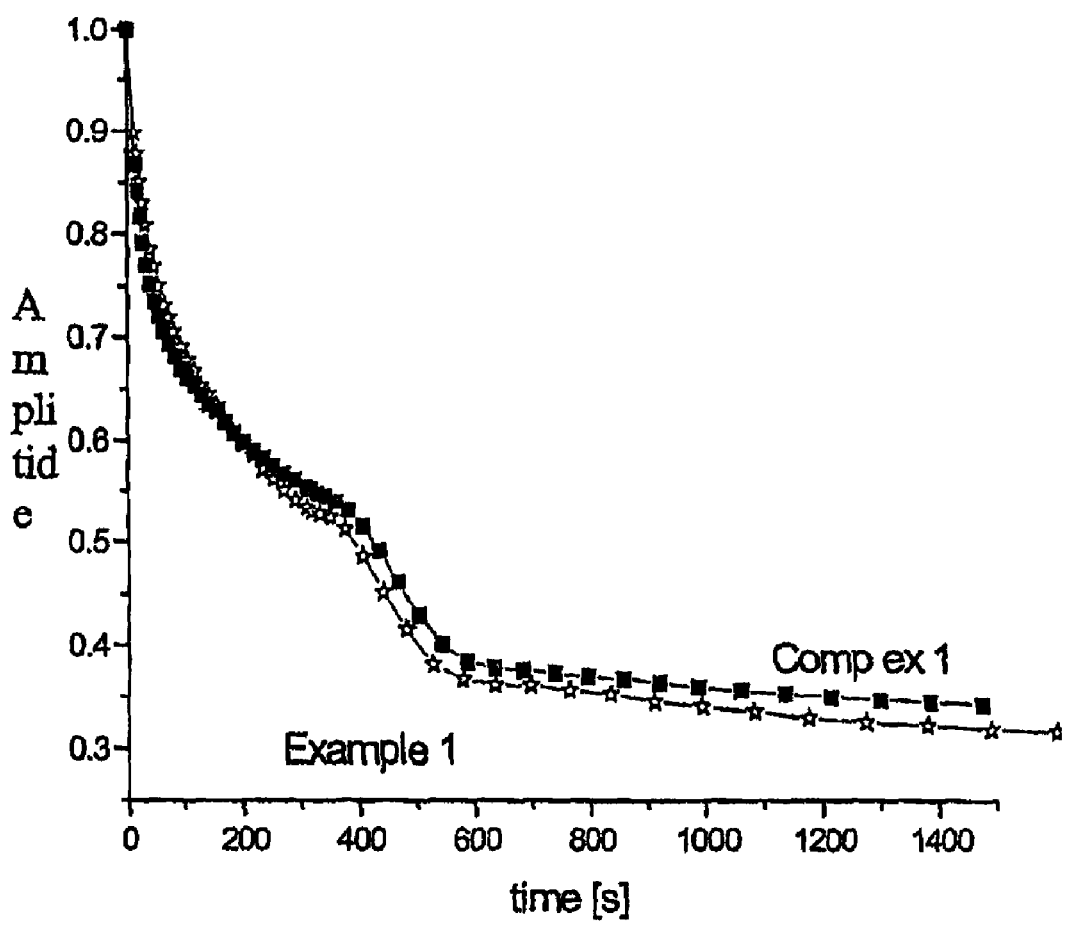
FIG. 5 illustrates the degree of levelling of substrate-applied paints (coatings) prepared in accordance with the present invention (Example 1) and in accordance with the prior art (Comparative Example 1).

The results shown in FIG. 4 clearly demonstrate the beneficial effect of having some late-stage paint fluidity on the leveling-out of telegraphed roughness. Even though these two formulations have the same degree of sagging (same wave shift, see FIG. 1) and the same degree of leveling-out of the surface roughness caused by the application process (see FIG. 5), the final appearance of the formulations according to the invention, having some paint fluidity in the oven suffers considerably less from surface roughness due to telegraphing.

Comparative Example 2

A 1K clear coat formulation was prepared based on polyols Setalux® 1795 and Setalux® 1760 (solids weight ratio 9/5) were used. SCA C (HDI-BA in Setalux® 1795) was used to introduce the SCA, partly replacing Setalux® 1795. As crosslinker a mixture of Setamine® US138 and Cylink® 2000 (ratio 5/1) was used, in a solids weight ratio polyol/crosslinker of 70/30, and diluted with Solvesso® 100 to the desired solids content at spraying viscosity (50.8%). The concentration of SCA was 1.8 wt % on solids. A detailed description of the used reference formulation is given in table 2. For the corresponding formulation at substrate viscosity used in the falling wave experiments, the formulation was allow to evaporate to obtain a solids content of 60.8%, thus mimicking the loss of solvents during spraying. The formulation thus obtained has a high-shear viscosity of 0.7 Pas.

Table 2 below shows the composition of the 1K reference formulation used in this study at spraying viscosity.

TABLE 2

|  | amount of total | amount of solids |
|---|---|---|
| Setalux 1795 VX-74 | 31% | 45% |
| Setalux 1760 VB-64 | 19% | 25% |
| Setamine US-138 BB-70 | 18% | 25% |
| Cylink 2000 | 5% | 5% |
| Byk 306 | 0.1% | |
| Byk 331 | 0.1% | |
| Solvesso 100 | 18% | |
| BDGA | 1% | |
| Xylene | 7% | |
| Nacure 5225 | 0.5% | |

Example 2

A 1K clear coat formulation was prepared based on polyols Setalux® 1795 and Setalux® 1760 (solids weight ratio 9/5) were used. SCA C and SCA D were used to introduce the SCAs, partly replacing Setalux® 1795. As cross-linker a mixture of Setamine® US138 and Cylink® 2000 (ratio 5/1) was used, in a solids weight ratio polyol/cross-linker of 70/30, and further formulated and diluted with Solvesso® 100 to the desired solids content at spraying viscosity as in comparative example 2. The total SCA concentration (wt % on solids) was 1.35%, the weight ratio of both SCA's was 1 to 1. Subsequently, as in comparative example 2, the solids content was raised to 60.8% by evaporation.

Example 3

A 1K clear coat formulation was prepared based on polyols Setalux® 1795 and Setalux® 1760 (solids weight ratio 9/5) were used. SCA C and SCA E were used to introduce the SCAs, partly replacing Setalux® 1795. As cross-linker a mixture of Setamine® US138 and Cylink® 2000 (ratio 5/1) was used, in a solids weight ratio polyol/cross-linker of 70/30, and further formulated and diluted with Solvesso® 100 to the desired solids content at spraying viscosity as in comparative example 2. The total SCA concentration (wt % on solids) was 1.35%, the weight ratio of both SCA's was 1 to 1. Subsequently, as in comparative example 2, the solids content was raised to 60.8% by evaporation.

Example 4

A 1K clear coat formulation was prepared based on polyols Setalux® 1795 and Setalux® 1760 (solids weight ratio 9/5) were used. SCA C and SCA F were used to introduce the SCAs, partly replacing Setalux® 1795. As cross-linker a mixture of Setamine® US138 and Cylink® 2000 (ratio 5/1) was used, in a solids weight ratio polyol/cross-linker of 70/30, and further formulated and diluted with Solvesso® 100 to the desired solids content at spraying viscosity as in comparative example 2. The total SCA concentration (wt % on solids) was 1.45%, the weight ratio of both SCA's was 1 to 1. Subsequently, as in comparative example 2, the solids content was raised to 60.8% by evaporation.

Figure 6:
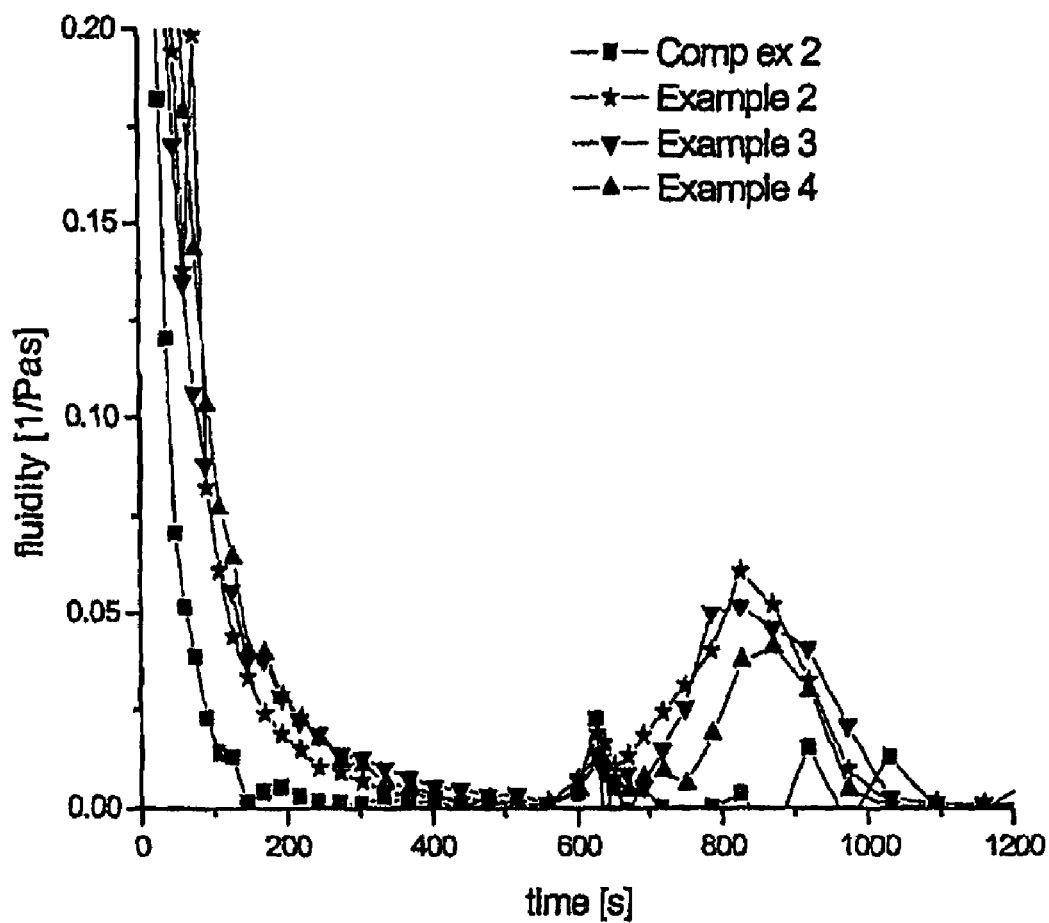
FIG. 6 illustrates the paint (coating) fluidity of formulations of Examples 2, 3 and 4 and Comparative Example 2 (as detailed below) and as determined in falling wave experiments.

In FIG. 6, the corresponding fluidity measured during falling wave tests for these formulations is shown. A 600 sec flash-off time was used; the dry layer thickness was ca 39 μm.

Figure 7:
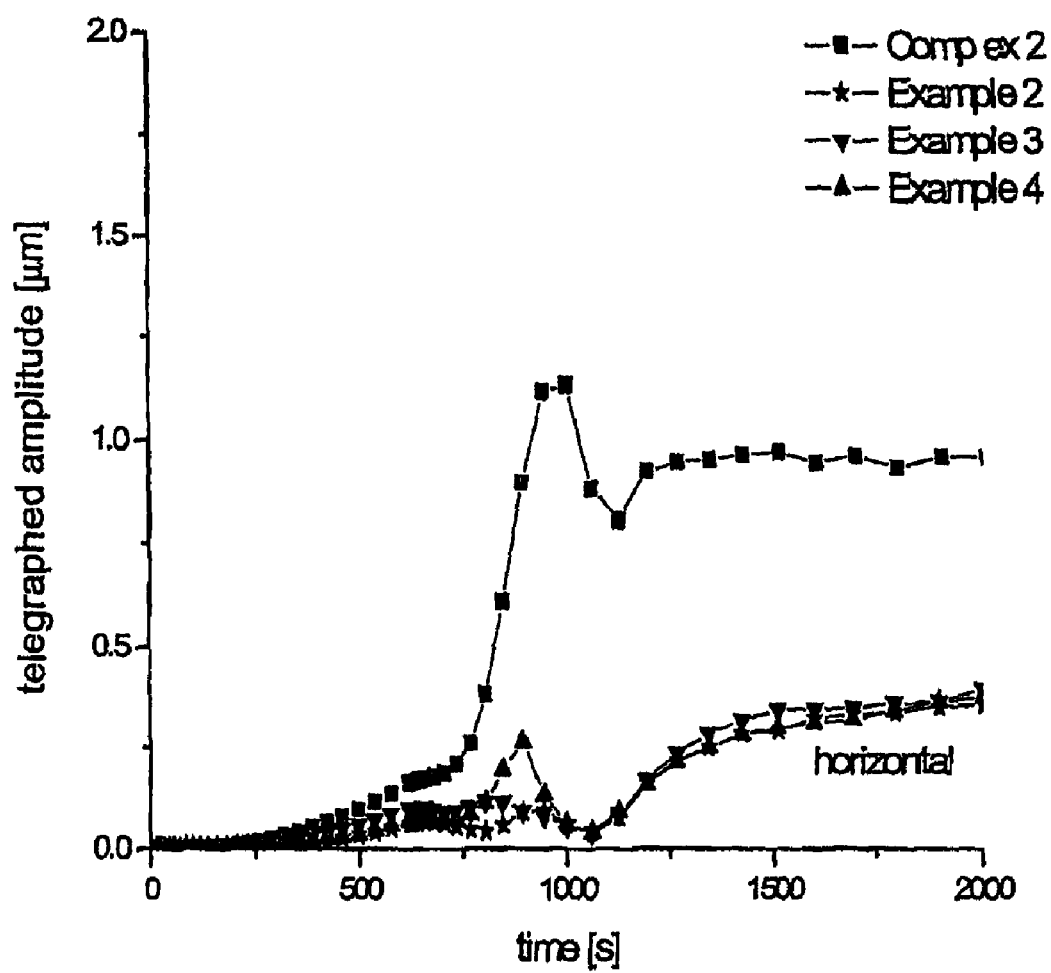
FIG. 7 illustrates the amplitude of telegraphed roughness of substrate-applied paints (coatings) prepared in accordance with the present invention (Examples 2, 3 and 4) and in accordance with the prior art (Comparative Example 2).

Falling wave tests were also done for the same formulations on a patterned substrate to obtain information on telegraphed roughness. In FIG. 7, the development (and leveling-out) of the amplitude of the telegraphed roughness is shown for horizontally dried and cured paints. As expected the amplitude of the telegraphed surface roughness is zero directly after application of the paint. Then, when solvent starts to evaporate leading to film shrinkage, the telegraphed amplitude starts to increase. Although the degree and rate of film shrinkage will be comparable in all tests, the telegraphed amplitude in the drying period is clearly not the same for all paints. This is due to differences in rate and degree of leveling-out of this telegraphed surface roughness. Indeed it can be seen that the final telegraphed amplitude is lower if, as in the formulations according to the invention, the paint fluidity in the late stages is higher.

For all of the examples hereinafter the coating formulations obtained, as well as the resulting coatings, were optically transparent and haze free, this aspect illustrating an important advantage of the materials prepared according to the invention.

The invention claimed is:

1. A composition that is curable at a temperature ($T_{cur}$) from 60° C. to 250° C., said composition comprising:
   i) a binder; and
   ii) a commixture for use as a sag control agent (SCA) in said composition and comprises:
   (a) a thixotropy-inducing particulate polyurea product having a melting temperature ($T_{m1}$) at least 10° C. below the curing temperature ($T_{cur}$), thereby satisfying the requirement $T_{m1} < (T_{cur} - 10°$ C.); and
   (b) a second thixotropy-inducing particulate component having a melting temperature ($T_{m2}$) such that retains its particulate nature at temperatures at least up to said curing temperature ($T_{cur}$).

2. A composition according to claim 1, curable at a temperature ($T_{cur}$) greater than 90° C.

3. A composition according to claim 1, curable at a temperature ($T_{cur}$) between 120° C. and 150° C.

4. A composition according to claim 1, wherein the melting temperature of said first polyurea component (a) is higher than ($T_{cure} - 60°$ C.).

5. A composition according to claim 4, wherein said polyurea reaction product (a) of the commixture is derived from a chiral, mono-amine provided in enantiomeric excess.

6. A composition according to claim 1, wherein the melting temperatures of the polyurea product (a) and said second particulate component (b) satisfy the requirement $T_{m2} \geq (T_{m1} + 10°$ C.).

7. A composition according to claim 6, wherein said polyurea reaction product (a) of the commixture is derived by reaction of an amine with the isocyanurate derivative of hexamethylene-1,6-diisocyanate (HMDI).

8. A composition according to claim 1, wherein the polyurea reaction product (a) of the commixture is derived by reaction of an amine with a substituted or unsubstituted linear aliphatic polyisocyanate or its isocyanurate.

9. A composition according to claim 8, wherein said polyurea reaction product (a) of the commixture is derived by reaction of an amine with hexamethylene-1,6-diisocyanate (HMDI).

10. A composition according to claim 1, wherein said second particulate component (b) of the commixture is selected from the group consisting of silica, polymeric microgels, clays and polyurea based products.

11. A composition according to claim 1, wherein said second particulate component (b) of the commixture is a polyurea reaction product.

12. A composition according to claim 11, wherein said second component (b) polyurea reaction product is derived by reaction of a polyisocyanate with an amine and wherein said polyisocyanate is selected from the group consisting of HMDI, trans-1,4-cyclohexylene diisocyanate, m-xylylene diisocyanate, p-xylylene diisocyanate, tetramethylxylylene diisocyanate and toluene diisocyanate.

13. A composition according to claim 12, wherein said amine used to derive said second component (b) is selected from the group consisting of n-aliphatic amines, cyclohexylamine, benzylamine and 2-phenethylamine.

14. A composition according to claim 1, wherein said commixture comprises 5-95 weight % of said first polyurea reaction product (a) and, reciprocally, 95-5 weight % of said second particulate product (b).

15. A composition according to claim 1, further comprising a solvent.

16. A composition according to claim 1, further comprising a cross-linking agent.

17. A composition according to claim 16, wherein said cross-linking agent of the coating composition comprises blocked isocyanates.

18. A composition according to claim 16, wherein said cross-linking agent of the coating composition is of a non-isocyanate type.

19. A composition according to claim 18, wherein said cross-linking agent of the coating composition is of a melamine formaldehyde type.

20. A composition according to claim 1, comprising from 0.05 to 10 wt % of the commixture (relative to the total weight of the composition).

21. A method of curing a composition comprising a binder and as a sag control agent (SCA) a commixture of (a) a thixotropy-inducing particulate polyurea product having a melting temperature $T_{m1}$ and (b) a second thixotropy-inducing particulate component having a melting temperature $T_{m2}$ where $T_{m2} > (T_{m1} + 10°$ C.), said method comprising heating said composition to a curing temperature $T_{cur}$ greater than 60° C. to 250° C., said $T_{cur}$ being characterized in that:
   i) $T_{m1} < (T_{cur} - 10°$ C.)
   ii) said second component is retained in a particulate state thereat.

22. A method according to claim 21, wherein said curing process occurs on a substrate to which the composition has been applied.

23. A method according to claim 21, wherein said curing temperature $T_{cur}$ is in the range from 120° C. to 150° C.

* * * * *